Aug. 9, 1960

H. L. DOBRIKIN 2,948,450

FLEXIBLE HOSE SUPPORT

Filed Sept. 24, 1956

Inventor
Harold L. Dobrikin by Parker & Carter
Attorneys

Aug. 9, 1960  H. L. DOBRIKIN  2,948,450
FLEXIBLE HOSE SUPPORT
Filed Sept. 24, 1956  2 Sheets-Sheet 2

Inventor
Harold L. Dobrikin
by Parker & Carter
Attorneys

United States Patent Office 2,948,450
Patented Aug. 9, 1960

2,948,450

FLEXIBLE HOSE SUPPORT

Harold L. Dobrikin, Chicago, Ill., assignor to Berg Manufacturing and Sales Company, Chicago, Ill., a corporation of Illinois Filed Sept. 24, 1956, Ser. No. 611,505

4 Claims. (Cl. 224—42.1)

This invention relates to trucks and trailers and has particular relation to the problem of properly and safely supporting flexible hose elements extending between the truck and the trailer.

Individual links of flexible hose, conveying, for example, air to brake members of a trailer, normally extend from the tractor rearwardly to the trailer. In order to permit articulation or flexing between the truck or cab and the trailer, for example, when the vehicle is turned or when it is articulated as it navigates hills and valleys, it is necessary for the hose to be of sufficient length to permit this action without injury to the hose. Accordingly, when the vehicle is level and in a straight line, the excess lengths of the hose creates a loop. In order to prevent contact of this loop with the ground, means must be provided for flexibly supporting the loop.

In the past it has been common to provide a fixed bracket or support along a rear wall of the truck cab and to suspend or support the flexible hose at a point intermediate the cab and the trailer from the bracket by means of a spring or other yieldable member. Difficulty has been experienced, however, in that the rearwardly supporting bracket fixed on the cab was in position to be contacted by the forward wall of the trailer when the truck and trailer combination moved through a dip or valley in the road, thereby jack-knifing the trailer and truck and bringing the forward wall of the trailer into contact with the bracket. Similarly, when the truck and trailer negotiated a turn, a substantial side pull was exerted on the hose and affixed bracket.

It is accordingly one purpose of my invention to provide a suitable support bracket of sufficient strength to satisfactorily support the flexible hose elements extending between a truck and trailer at points intermediate the two.

Another purpose is to provide such a bracket which shall be effective to permit satisfactory flexible support of such hose elements while at the same time avoiding the difficulties experienced with prior known structures.

Another purpose is to provide such a bracket which shall be economical to manufacture, simple to install and yet fully effective for the desired purposes.

Other purposes will appear from time to time during the course of the specification and claims.

I illustrate my invention more or less diagrammatically in the accompanying drawings wherein—

Like parts are indicated by like numerals throughout the specification and drawings.

Figure 1:
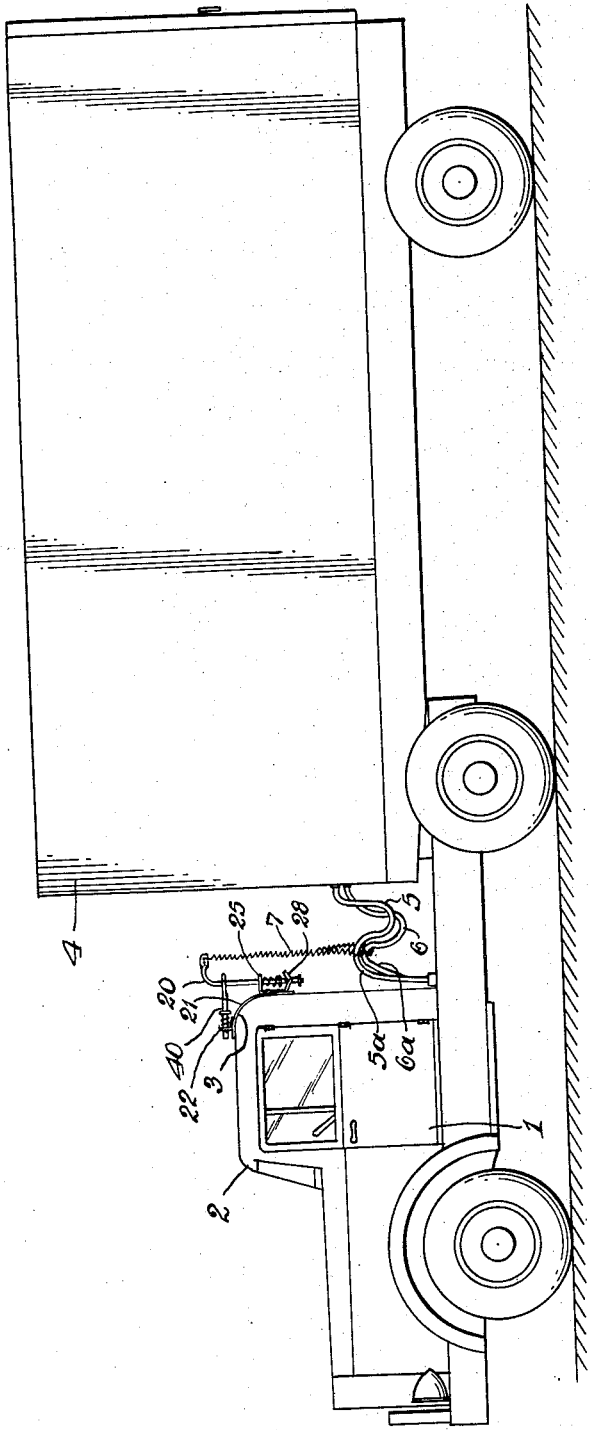
Figure 1 is a side view partially illustrating a truck and trailer with the structure of my invention positioned therewith.

Referring now to the drawings and particularly to Figure 1, the numeral 1 generally indicates a truck. 2 is a truck cab having a generally upper curved wall edge 3. It will be understood that the metal of the cab 2 and consequently of the edge 3 is of very thin sheet stock as discussed further hereinbelow. 4 is a trailer flexibly connected to the truck 1 in any suitable manner. 5 and 6 are flexible hoses extending from the truck to the trailer. The hose 5 has a looped excess portion 5a and the hose 6 has a looped or excess portion 6a positioned intermediate the truck and trailer. 7 is a spring element connected to the loops 5a, 6a at one of its ends and connected at its opposite end to a hose support arm 20 positioned above the loops 5a, 6a.

Figure 2:
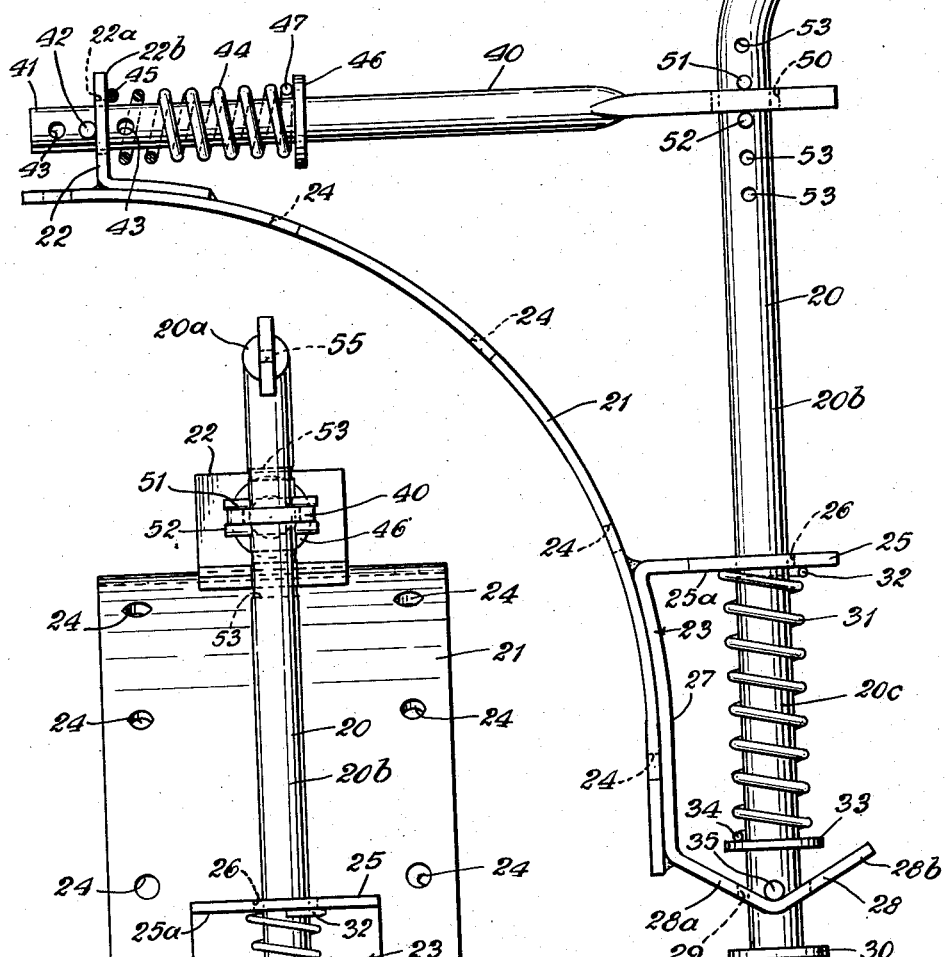
Figure 2 is a side elevation on an enlarged scale illustrating my invention.
Figure 3:
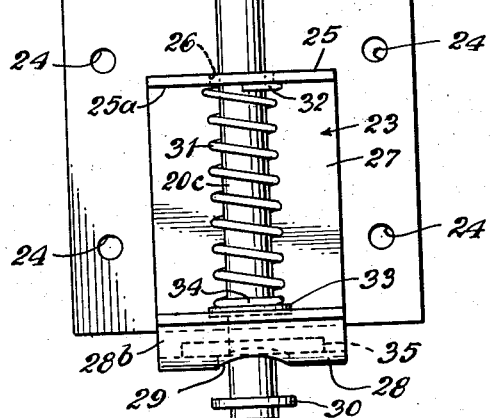
Figure 3 is an end view of my invention.

Referring particularly to Figure 2, the supporting structure for the flexible hoses 5, 6 and yielding member or spring 7 is illustrated on a larger scale. An arcuate or formed mounting plate 21 may carry adjacent its forward upper edge surface a bracket 22. A bracket member shown generally at 23 may be similarly secured to the outer rear edge surface of the mounting plate 21. It will be understood that the mounting plate 21 is fixed to the rear upper cab edge 3 in any suitable manner. I may, for example, provide a series of openings 24 in the plate 21 in which any suitable fastening elements may be positioned. The main support arm 20 may have a generally horizontally positioned outer supporting end portion 20a, and a vertically directed downwardly disposed main portion 20b. The bracket 23 has an upper rearwardly directed horizontally disposed plate portion 25 having a generally centrally positioned aperture 26 therein. The bracket member 23 has a forward wall 27 secured to the mounting plate 21 and a lower V-shaped rearwardly extending portion 28 having generally centrally positioned therein, in the apex of the V, an opening or aperture 29. The element 28 has a fixed downwardly inclined rearwardly disposed portion 28a and a rear portion 28b upwardly inclined from the outer end of the portion 28a, the main support arm portion 20b extends downwardly through the apertures 26, 29 and carries adjacent its lower end a pin or flange or ring 30 of larger diameter than the aperture 29 and effective to keep the arm 20 from riding upwardly through the aperture 29 beyond a predetermined extent of travel. Surrounding that portion 20c of the arm 20 extending between the spaced bracket elements 25, 28 is a coiled spring or yielding means 31 having its upper end positioned against the lower surface 25a as at 32. A retainer flange or ring or pin 33 is secured to the arm portion 20c at a point spaced downwardly from the bracket element 25 and a spring 31 at its opposite end positioned against the spring retainer 33 as at 34. The retainer 33 is spaced upwardly from the bracket element 28 and a circumferential pin 35 may extend through and be secured to the arm portion 20c at a point between the elements 33 and 30 and above the bracket 28. A shock absorbing arm 40 has one end 41 extending through an aperture 22a in the bracket 22 and a pin 42 extends through the end 41 outside or forwardly of the bracket 22. The retainer 42 may be positioned at a variety of points on the end 41 for adjustment purposes and to this end I provide a plurality of retainer attachment points which may, for example, when the element 42 constitutes a pin, comprise a series of spaced apertures 43. A yielding member such as the spring 44 may be coiled about the arm 40 adjacent the bracket 22 and may have one of its ends in contact with the rear face 22b of the bracket 22 as at 45. The opposite end of the spring 44 may be in contact with a spring retainer element 46 attached to the arm 40 rearwardly of the bracket 42 as at 47. The arm 40 extends rearwardly a distance sufficient to overlie the bracket 23 and carries adjacent its rear end an aperture 50 through which the arm 20 extends. A pair of spaced retainer or positioning elements 51, 52 may be secured to the arm 20 above and below or on opposite sides of the arm 40. For adjustment purposes, I may provide a plurality of attaching elements for the retainers 51, 52 and where the elements 51, 52 constitute pins, I may provide a plurality of spaced, laterally directed apertures 53 in the arm 20 along the portion of the arm 20 which suitably pass through the apertures 50. The rearwardly directed arm portion 20a may carry adjacent its outer end a plurality of attachment means such as the apertures 55 for the yielding hose support or spring 7.

Whereas I have described and claimed a practical and operative device, nevertheless many changes may be made in the size, shape, number and disposition of parts without departing from the spirit of my invention. I therefore wish my description and drawings to be taken as, in a broad sense, illustrative or diagrammatic, rather than as limiting me to my precise showing.

The use and operation of my invention are as follows—

The mounting plate 21 may be flexed to conform to the particular configuration of the cab roof edge 3 and may be suitably secured thereto. The arms 20, 40 may be engaged one with the other as at 50 and the arm ends may be inserted through the brackets 22, 23. The spring or other flexible extension 7 may then be secured to the arm 20 as at 55 and to the flexible hoses 5, 6 as indicated in Figure 1.

If, in operation, the forward wall of the trailer 41 should be brought into contact with the arm portion 20a, the force thereof is transmitted into engagement as at 50 to the arm 40 which is thereby moved forwardly through the bracket 22, the force thereof being absorbed by the spring 44. There being no resistance to the forward movement of the arm 20, no damage is caused either to the support bracket of my invention or to the forward wall of the trailer 4. The apertures 26, 29 in the bracket portions 25, 28 are of sufficient diameter to permit the tilting action of the arm 20. Upon return of the trailer 4 to normal position, the spring 44 is effective to return the elements of my invention to the normal position illustrated in Figures 1 and 2.

When side forces are exerted on the flexible hoses 5, 6 and thereby on the element 7, the arm 20 and portion 20a thereof are free to rotate in response thereto. The apertures 50, 26, 29 are formed and adapted to permit rotation of the arm 20 and portion 20b therein. Rotation of the arm 20, however, causes movement of the pin or ear 35 upwardly along the inclined upper surface 28a, 28b, thus raising the entire arm 20 through the bracket 23. The consequent tilting of the arm 40 is provided for by the arrangement of the aperture in the bracket 22 in which the arm 40 is retained by the flexible spring 44 and retainer 42. As the side forces diminish or cease, the spring 31 is effective to urge the arm 20 downwardly through the apertures 26, 29 of the bracket 23. Downward movement of the arm 20 is effective to return the cams or pins 35 along the inclined surfaces of the bracket portion 28 into the cradle formed at the central juncture of the inclined portions 28a, 28b. This action is effective to center the arm 20 and to position the arm portion 20a in the rearwardly disposed position shown in Figures 1 and 2.

I claim:

1. In a support, a mounting plate, a first bracket on said mounting plate, an aperture in said bracket, a main arm having a portion extending through and rotatably mounted in said aperture, said aperture having a diameter greater than that of said main arm, said bracket having an inclined portion, a positioning element on said arm positioned normally to seat upon said bracket and to ride along said inclined portion in response to rotation of said arm and thereby to cause longitudinal movement of said arm in one direction in said aperture and yielding means positioned to urge said arm in the opposite longitudinal direction through said aperture to move said positioning element in the opposite direction along said inclined portion to return said arm to its original position, said arm being tiltably supported on said bracket by said positioning element, shock absorbing means flexibly connected at one end to said arm and at another end to said plate, said shock-absorbing means including an arm slidably supported on said plate, yielding means surrounding said last-named arm and having its opposite ends in contact with said arm and said plate whereby said yielding means is compressed in response to tilting of said main arm on said bracket in one direction.

2. In a support for attachment to a vehicle to support an air hose, an arcuate base plate having the same contour as a portion of the vehicle and formed and adapted for attachment to said vehicle portion, a first bracket secured to said plate, a main hose-supporting arm tiltably, rotatably and slidably supported in normally a substantially vertical plane on said bracket, yielding means operative against said bracket and said arm to urge said arm in one longitudinal direction in a substantially vertical plane, a second bracket secured to said plate at a point spaced from said first bracket, a rod slidably mounted in said second bracket adjacent one end of said rod, said rod having a lost-motion connection with said arm adjacent the opposite end of said rod, a spring having its opposite ends in contact with said rod and said second bracket, respectively whereby said spring is compressed in response to tilting of said arm and movement of said rod in one direction.

3. A support for flexible hose and the like comprising a mounting plate, a first bracket secured to said mounting plate and extending outwardly therefrom, a hose-supporting arm mounted on and supported by said bracket for substantially vertical slidable movement in relation thereto, said supporting arm being mounted for rotation about a substantially vertical axis on said bracket simultaneously with slidable movement of said arm in relation to said bracket, yielding means operatively associated with said bracket and said arm and effective to urge said arm in one axial direction, said arm being mounted on said bracket for tilting movement about substantially a horizontal axis, a second bracket spacedly positioned on said plate, a rod slidably mounted on said second bracket and having a lost-motion connection with said arm, yielding means having its opposite ends in contact with said second bracket and said rod whereby said yielding means is compressed in response to axial movement of said rod in one direction, said rod being axially movable in said direction in response to tilting movement of said arm in one direction about said horizontal axis.

4. A support for attachment to a vehicle to support flexible hose and the like, comprising a main plate formed and adapted for attachment to a portion of the vehicle, a hose-supporting arm mounted on said plate for rotation about a substantially vertical axis and for tilting about a substantially horizontal axis, a rod slidably mounted on said plate for slidable movement in relation thereto along a substantially horizontal axis, said rod having a portion operatively engaging said arm and being movable in one direction along said last-named horizontal axis in response to tilting of said arm about said first-named horizontal axis and yielding means engaging said plate and said rod adjacent one end of said rod whereby said yielding means is caused to resist said last-named movement of said rod.

References Cited in the file of this patent

UNITED STATES PATENTS

| 1,299,343 | Hoag | Apr. 1, 1919 |
| 1,386,621 | Hughes | Apr. 9, 1921 |
| 2,280,476 | Calvert | Apr. 21, 1942 |
| 2,554,176 | Edwards | May 22, 1951 |
| 2,637,474 | Di Vincenzo | May 5, 1953 |